April 21, 1931. W. GAUS ET AL 1,801,857
PRODUCING COMBUSTIBLE GASES
Filed Nov. 3, 1923
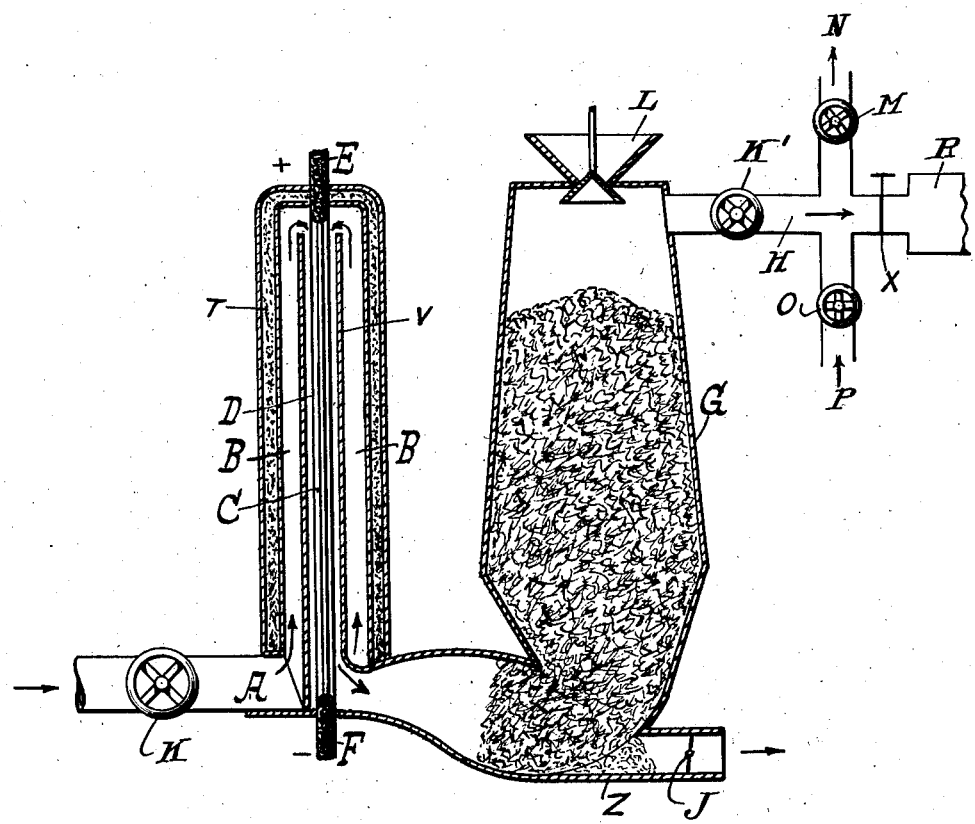
INVENTORS
William Gaus
Wilhelm Wild
By Hauff&Warland
ATTORNEYS Patented Apr. 21, 1931

1,801,857

UNITED STATES PATENT OFFICE

WILHELM GAUS AND WILHELM WILD, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCING COMBUSTIBLE GASES

Application filed November 3, 1923, Serial No. 672,643, and in Germany November 7, 1922.

This invention relates to an improvement in the production of combustible gases by acting on coke, coal, brown coal or other solid carbonaceous material, which is preferably non-bituminous, with a medium capable of reacting therewith to form a combustible gas. This medium will be hereinafter referred to as a "gasifying medium" and varies with the combustible gas desired as a final product. For example, for the production of water gas or blue gas, steam is used; for the production of semi-water gas, air and steam are used; and for the production of carbon monoxid or producer gas, air or carbon dioxide or mixtures of the same with each other or with other gases, such as oxygen, are used. In many cases such processes require a large supply of heat which with the usual methods is effected by intermittent air blasting with a rapid current of air blown through the incandescent fuel, and which may be assisted by preheating the steam or air or other gasifying medium.

We have found that the production of combustible gases according to the aforementioned methods can be effected with particular advantage by preheating the gasifying medium prior to its admittance into the gas producer by means of a high tension electric arc of any kind, such as have been suggested in most various types for fixing the atmospheric nitrogen, for example, a disc-like arc flame, or any other conventional form of arc. The extremely high temperature of the arc flame renders it possible to effect the preheating in a comparatively small space and with a high efficiency and in a degree as could not be attained hitherto by any other means in a satisfactory manner.

The capacity of the arc and the quantity of the gasifying medium heated thereby must be accommodated to each other to produce the degree of preheating desired in each case and we may also recommend the introduction of the gasifying medium into the electric arc in a partially preheated condition as may be obtained by first conveying the gasifying medium around the walls of the arc space, through which walls the medium may then be led to the arc by means of proper openings, and by properly varying or closing the latter the degree of preheating may be regulated within certain limits.

The efficiency of the electric arc to heat the medium may be further increased by preheating the latter before its entrance into the arc by means of the heat of the hot combustible gas leaving the gas producer while using suitable heat exchangers.

The process described can be used with particular advantage for the gasification of low-grade fuel, rich in ash-forming admixtures in conjunction with the use of gas producers with formation of molten slag, as the large amount of heat required for gasification and fusion can thus be readily secured.

The electric heating process aforedescribed is also very suitable for the production of nitrogen-hydrogen mixtures for synthetically producing ammonia. Such mixtures may be directly obtained in the proportions required by operating a water gas generator with a mixture of steam and air, or oxygenated air, in a proportion suitable to give rise to a mixture of one volume of nitrogen to each three volumes of the sum of hydrogen and carbon monoxid, preheating said gasifying mixture by means of the high tension electric arc, passing it through the incandescent fuel and finally replacing the carbon monoxid by hydrogen, either by passing it over heated calcium hydroxid, or by catalytically decomposing it with steam or by any other suitable method. A continuous operation of the producer is thus very easily and reliably secured.

The invention will be further illustrated with reference to the accompanying diagram which illustrates in vertical section an apparatus suitable for carrying out the process according to the present invention.

A is a pipe which can be closed or regulated by the cock K for the introduction of a gasifying medium to the apparatus S, a tall vertical chamber which is well insulated against loss of heat to the outer atmosphere by means of the insulating packing T. E and F are two electrodes arranged at the top and bottom of the said chamber respectively. The said chamber contains a further concentrically arranged chamber therein surrounded by the wall V in which an electric arc C burns between the said electrodes E and F. The gasifying means coming from A first pass upward through the intermediate space B and then downward through the arc space C. G is an upright generator for the gasification of the solid fuels. W is a passage at the bottom of the said generator for the introduction of the gasifying agent, for gasification of the fuel, which is introduced into the generator from the hopper L. Ash is removed from the generator by way of the pipe Z and door J. The gases are drawn off from the generator G by means of the pipe H which can be regulated by means of the cock K'. The gases which are thus obtained may either be drawn off by way of the pipe N which can be closed by means of the cock M or any carbon monoxide contained therein may be converted into carbon dioxide in the chamber R containing a catalyst consisting of iron oxide by means of steam which can be introduced by way of the pipe P. The said pipe P can be closed by the valve O. If the gases are to be drawn off unchanged, the valve O and the valve X are closed and the valve M is opened, whereas if the gases are to be passed through the catalyst chamber, the valve O and the valve X are opened and valve M closed.

The following example will further illustrate, with reference to the accompanying drawing, how our invention may be carried into practical effect, but it will be understood that the invention is not limited to this specific modification. Steam is introduced by way of the passage A and passes upward through the space B where it is preheated and thence downward into the arc chamber D where an electric arc C burns between the electrodes E and F. The steam issuing from the arc at W, having a temperature of about 1200° C., passes into the bottom of the generator G which contains incandescent coke also having a temperature of about 1200° C. The water gas thus obtained is drawn off by way of the pipes H and N, the cock O and the valve X being closed. The gas thus obtained has approximately the following composition by volume:—

CO 40.6 per cent, $H_2$ 42.3 per cent, $CO_2$ 6.4 per cent, $C_mH_n$ 0.2 per cent, $CH_4$ 0.5 per cent, $N_2$ 10.0 per cent.

If it is desired to convert the carbon monoxide contained in the gas into carbon dioxide, the cock M is closed and the valve O and the valve X opened and steam is introduced at P, the carbon monoxide being thus converted into carbon dioxide in the catalyst chamber R. The carbon dioxide may be removed from hydrogen by any suitable means, for example, by passing the gas mixture over lime or through alkaline solutions capable of absorbing carbon dioxide. The pipe J for the removal of the ash is provided with a door, not illustrated in the drawing, for shutting it up as desired.

We claim:

1. The production of combustible gas, which comprises passing a gasifying medium first around the walls of an electric arc space, then through the latter thereby preheating the gas, and then through solid incandescent carbonaceous material, whereby a combustible gas is generated by gasification of the carbonaceous materials.

2. The production of combustible gas, which comprises passing steam first around the walls of an electric arc space, then through the latter, thereby preheating the steam, and then through solid incandescent carbonaceous material, whereby a combustible gas is generated by gasification of the carbonaceous materials.

In testimony whereof we have hereunto set our hands.

WILHELM GAUS.
WILHELM WILD.